United States Patent Office 3,268,817
Patented August 23, 1966

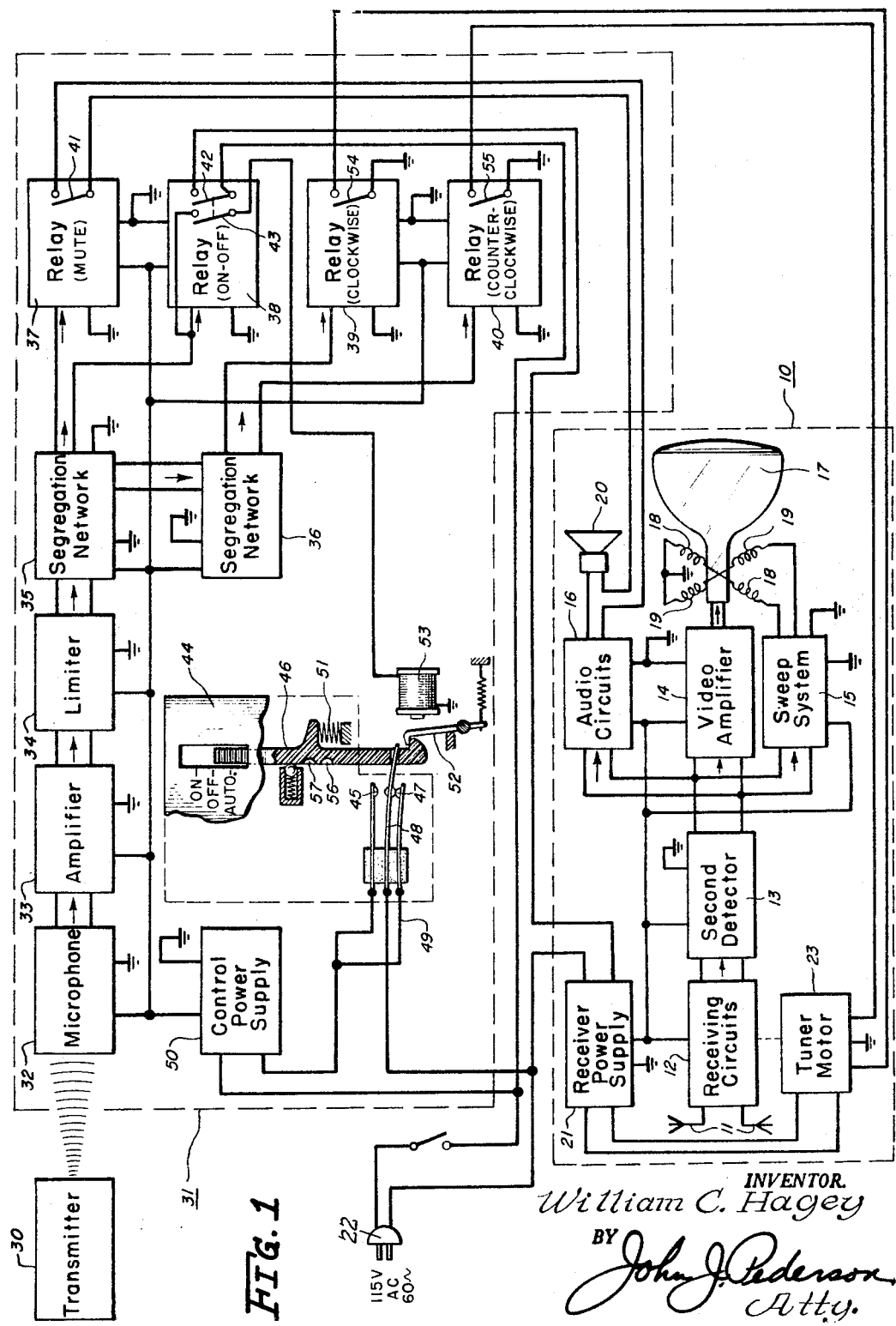

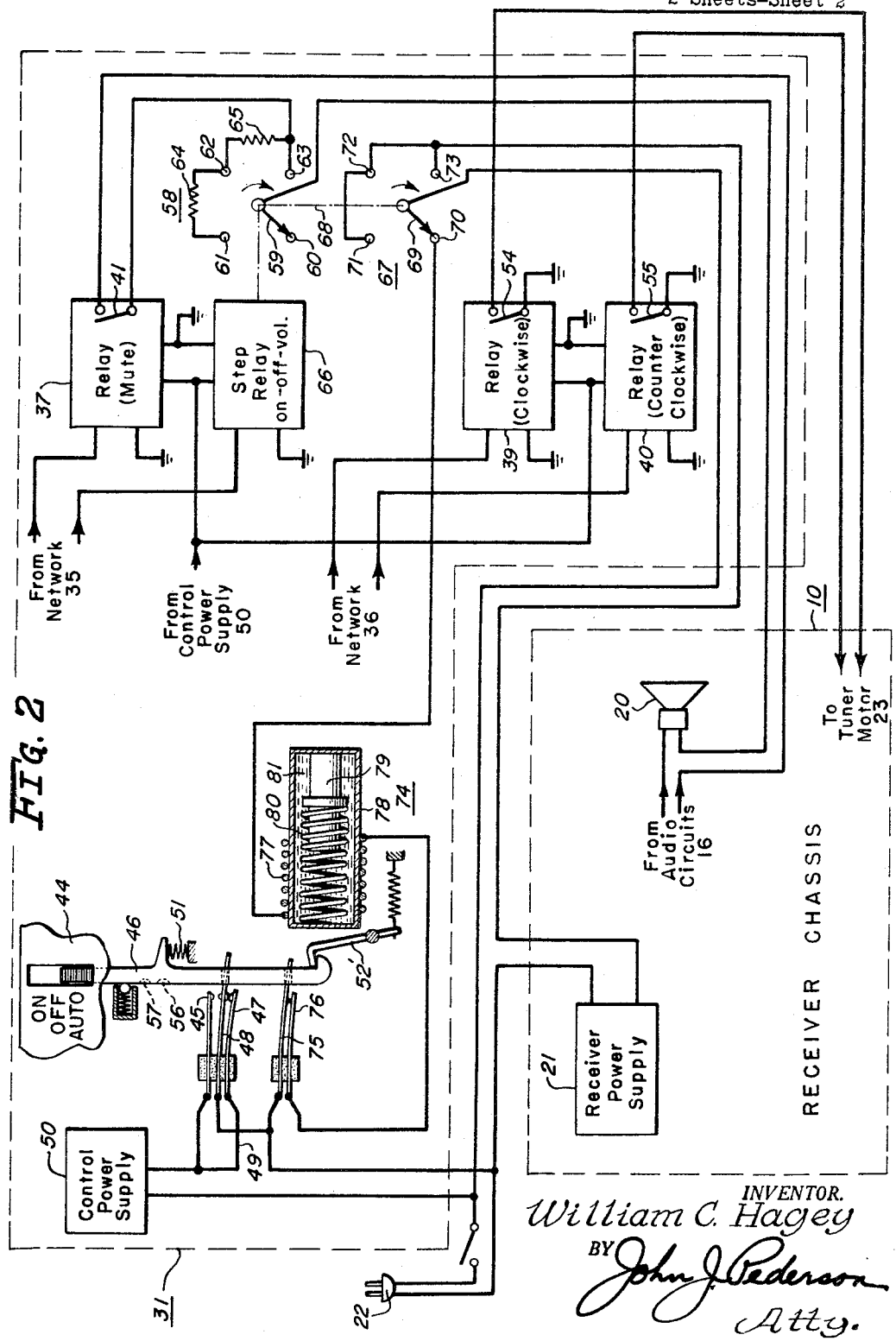

3,268,817
REMOTE CONTROL SYSTEM HAVING TIME DELAY MEANS
William C. Hagey, La Grange, Ill., assignor to Zenith Radio Corporation, a corporation of Delaware
Filed June 13, 1960, Ser. No. 35,577
2 Claims. (Cl. 325—391)

This invention relates to wave-signal receivers and more particularly to such receivers equipped for remote control.

At the present time there are many different types of remote control systems for wave-signal receivers. These systems usually consist of some type of electromagnetic or acoustic transmitter generating a control signal which is detected by an auxiliary chassis responsive to the received control signal. The auxiliary chassis circuits convert the received control signal to a form suitable to initiate its assigned control function. In general, the control function may correspond to any selected operating adjustment of the receiver, such as station selection, volume control, or on-off control of the receiver chassis.

With present systems, when the receiver chassis is turned "off" by remote control, the auxiliary chassis remains energized, keeping the receiver ready to be turned on again remotely. As a result of this type of operation, the auxiliary chassis accumulates a much greater number of operating hours than does the receiver chassis and hence requires more frequent servicing.

Moreover, continuous energization of the auxiliary chassis for long periods of time may in some instances constitute a substantial fire hazard. With present remote control systems, the auxiliary chassis can be de-energized by manual operation of the main power switch, but this is at best an inconvenient solution which fails to provide for complete remote shutoff at times when such operation is needed, as after the late late movie without getting out of bed.

It is a primary object of this invention to provide a wave-signal receiver of the type equipped for remote control which is convenient to use, free from safety hazards, economical to operate, and which requires a minimum of maintenance.

Intelligence reproducing apparatus constructed in accordance with the invention comprises a main chassis and remote control means including an auxiliary chassis responsive to received remote-control signals and a stepping switch, operative from the auxiliary chassis, having an operating cycle of a predetermined number of positions, in one of which positions the main chassis is de-energized and in response to actuation between the remainder of which positions predetermined control is exercised over the operation of the main chassis while maintaining the main chassis in an energized condition. Also included are control-signal-responsive means for de-energizing the auxiliary chassis. The receiver further comprises bistable switch means, coupled to the auxiliary-chassis-de-energizing means, operable between a first stable position in which the auxiliary chassis de-energizing means are conditioned for concomitant operation with the de-energization of the main chassis, and a second stable position in which the auxiliary-chassis-de-energizing means are effectively disabled. The apparatus further comprises delay means, included within the auxiliary chassis de-energizing means and coupled to the stepping relay, for permitting the auxiliary chassis de-energizing means to de-energize the auxiliary chassis, when the bistable switch is in its first position, only upon sustained de-energization of the main chassis by the remote control means for a predetermined interval and for permitting cycling through the one position of the stepping relay without de-energizing the auxiliary chassis, by remote control at the option of the user.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 1 is a schematic diagram of a television receiver embodying the present invention; and FIGURE 2 is a schematic diagram of another embodiment of the invention.

In FIGURE 1, a conventional television receiver chassis 10 is shown in simplified block diagram form as an example of the type of wave-signal receiver to which the present invention is particularly applicable.

The receiver chassis 10 includes an antenna 11 coupled to a receiving circuit unit 12; receiving circuits 12 may include the usual radio-frequency amplifier, station selector, first detector, and intermediate-frequency amplifier stages found in most conventional receivers. Receiving circuits 12 are coupled to a second detector 13 which, in turn, is coupled to a video amplifier 14, a sweep system 15, and to the usual audio circuits 16. The output of video amplifier 14 is coupled to the electron gun of a cathode-ray image reproducer 17. The output of sweep system 15 is coupled to the deflection yoke associated with the picture tube, here illustrated schematically by coils 18 and 19. Audio circuits 16 are coupled through a relay 37 to the usual loudspeaker 20. The operating circuits of the receiver are provided with the necessary operating potentials from a receiver power supply 21 which is energized from an ordinary 115-volt 60-cycle source as indicated by the power plug 22. A tuner motor 23 is mechanically connected to the station-selection section of receiving circuits 12 to permit remote control of this stage of the receiver.

The construction and operation of television receiver 10 is entirely conventional and may be varied as desired without having any effect upon the invention; accordingly, only an extremely brief description of its operation is included here. A television signal is intercepted at antenna 11 and suitably amplified and detected in receiving circuits 12 to develop an intermediate-frequency signal which is supplied to second detector 13. The second detector develops a composite video signal which is supplied to video amplifier 14, sweep system 15, and audio circuit 16. The video information portions of the signal are utilized to control the intensity of an electron beam developed in picture tube 17, whereas the synchronizing signals are employed to control deflection of the beam across the image screen of the picture tube under the influence of the sweep signals developed in system 15 and applied to deflection yoke 18, 19. The audio portion of the composite video signal is suitably detected in circuit 15 and employed to energize loudspeaker 20.

The remote control system includes a portable transmitter 30 which selectively develops four ultra-sonic acoustic signals of different frequencies to effect remote control operation of receiver chassis 10. The wave-signal receiver comprises an auxiliary chassis 31 which is preferably mounted in the same cabinet as receiver chassis 10 and which comprises a microphone 32 coupled to a suitable amplifier 33. Amplifier 33 is in turn connected to a limiter circuit 34, the output stage of the limiter being coupled to a pair of series-connected segregation networks 35 and 36. Segregation network 35 is connected to two relays 37 and 38; network 36 is similarly coupled to a pair of relays 39 and 40. The respective stages of auxiliary chassis 31 are energized by a control power supply 50 coupled to power plug 22.

Relay 37 includes a switch 41 which is connected in series with one of the input leads for loudspeaker 20. Relay 38 comprises a switch 42 connected in series with one of the power leads between power plug 22 and receiver power supply 21. Relays 39 and 40 include switches 54 and 55 respectively which are incorporated in the energizing circuits of tuner motor 23. The control power supply 50 is suitably connected to each of circuits 32–36 and to relays 37–40.

As thus far described, the receiver corresponds to that described in U.S. Patent 2,821,954, granted to Robert Adler on February 4, 1958, and assigned to the same assignee as the present application. Briefly, its operation is as follows:

The control system is actuated by ultrasonic signals radiated from transmitter 30. The ultrasonic signal impinges upon microphone 32 and amplifier 33 generates an electrical input signal having a frequency representative of the received acoustic signal. The electrical input signal is applied to a limiter 34, which generates an amplitude-limited signal having a frequency equal to an integral multiple of the electrical input signal frequency. The amplitude-limited signal is applied to segregation networks 35 and 36, which distinguish the desired amplitude-limited signal from extraneous noise signals. In the illustrated embodiment transmitter 30 develops four distinctive ultrasonic actuating signals; consequently the remote control system is adapted to the regulation of four individual functions of receiver chassis 10. The received signals are distinguished from each other in segregation networks 35 and 36 on a frequency basis. The frequency of the control signal determines which of the four relays 37–40 is actuated, and hence the control function which is effected. When relay 37 is actuated by the proper ultrasonic signal from the transmitter, the relay alternately opens and closes the audio input circuit to the speaker; thus, when the audio input circuit is opened the sound from the loudspeaker 20 is muted, and when closed, the sound is restored to its original volume. Actuation of relay 38 alternately energizes and de-energizes the receiver chassis 10. Relays 39 and 40 are of the instantaneous type and control the reversible tuner motor 23.

In accordance with the present invention, the television receiver is provided with control-signal responsive means for de-energizing auxiliary chassis 31, and with switch means operable between a first position in which the auxiliary chassis de-energizing means are conditioned for concomitant operation with the de-energization of receiver chassis 10, and a second position in which the auxiliary-chassis-de-energizing means are effectively disabled. In this manner, the receiver chassis and the auxiliary chassis may both be de-energized, or the receiver chassis may be separately de-energized, by remote control at the option of the user.

In the embodiment of FIGURE 1, a three-position switch 44 is interposed in one of the leads from power plug 22 to control power supply 50. Switch 44 includes two fixed contacts 45 and 47, and a movable switch arm 48 adapted to selectively contact fixed terminals 45 and 47 or to be switched to an "off" position which is midway between the two fixed terminals. Fixed terminals 45 and 47 are directly connected together by means of a lead 49. Thus, whenever switch arm 48 contacts either terminal 45 or terminal 47, control power supply 50 is operatively connected to power plug 22. A slide bar 46, which is operatively connected to switch arm 48, is switchable into three positions which correspond to the three positions of switch arm 48. These slide bar positions are designated "ON," "OFF," and "AUTO."

In the preferred embodiment of the invention, switch arm 48 is manually operable by means of slide bar 46 into any of the three positions. In the "AUTO" (or "automatic") position slide bar 46 is retained in that position against the compression force of a biasing spring 51 by means of a latch device 52. In both the "ON" and "OFF" positions detents 56 and 57 respectively hold slide bar 46 in position.

The receiver of the present invention also comprises an additional pair of contacts or switch 43 arranged for operation in unison with contacts or switch 42 of relay 38 and connected in series between the input signal lead to the actuating element of relay 38 and a solenoid 53 associated with switch 44. Solenoid 53 is the actuating element of a relay including latch device 52, and is responsive to an applied voltage to release slide bar 46 from latch device 52. Relay 38 is constructed so as to be slow acting in comparison with relay 53, 52.

In operation, with switch arm 48 in contact with terminal 45, the remote control system operates in precisely the same manner described in detail in the above-identified Adler patent. Upon generation of successive ultrasonic control signals of the appropriate frequency by transmitter 30, relay 38 is operated to turn the set alternately on and off, while the control power supply 50 remains continuously energized to maintain auxiliary chassis 31 in constant readiness for the reception of and response to additional remote control signals. Relay 38 is a step-type or ratchet relay. On successive voltage or control pulses from segregation network 35 switches 42 and 43 are alternately opened and closed in unison. Switch 42 serves to energize or de-energize receiver chassis 10. When switch 42 is open, the circuit between power input plug 22 and receiver power supply 21 is open and receiver chassis 10 is "off." When switch 42 is closed, the circiut is completed and receiver chassis 10 is "on."

However, a receiver constructed in accordance with the present invention may also be readily conditioned so that the on-off control pulse de-energizes both auxiliary chassis 31 and receiver chassis 10 simultaneously. This is accomplished by manually operating switch 44 to its alternate position in which switch arm 48 contacts terminal 47. By manually setting this switch in this position, switch arm 48 is latched against the bias presented by spring 51. If switch 43 of relay 38 is in its open condition when a voltage pulse is applied to relay 38, no voltage reaches solenoid 53 of relay 53, 52 and no actuation of relay 53, 52 takes place. However, if switch 43 is in its closed condition when a voltage pulse is applied to relay 38, relay 53, 52 is actuated. This has the effect of making relay 53, 52 sensitive only to "off" control signals.

When an on-off control pulse is applied to relay 38, assuming that this control pulse finds switches 42 and 43 both in the circuit-closed positions so that chassis 10 and 31 are both operating, the control pulse is applied through switch 43 of relay 38 to solenoid 53 which releases latch 52 and permits switch arm 48 to spring into its "off" position. The same control pulse energizes the actuating element of relay 38 at a slightly later instant, since relay 38 is of the delayed-action type relative to relay 53, 52, and this operation opens switches 42 and 43 thus de-energizing receiver power supply 10 in the usual fashion. Thus, the user may at any time condition the receiver for complete shut-off by remote control, through the simple expedient of manually operating switch 44.

The third position of switch 44 is an "off" position provided so that control chassis 31 may be completely disabled in the event of malfunction of some component thereof, thus permitting at least manual operation of the receiver chassis 10 until such time as the auxiliary chassis 31 has been serviced or repaired.

Thus, solenoid 53 and latch device 52 constitute an auxiliary relay which serves as a control-signal-responsive or control pulse responsive means for de-energizing auxiliary chassis 31, while switch 43 and its associated circuit connections constitute actuating means for the auxiliary chassis de-energizing means for supplying control pulses thereto. Switch means 44 constitutes means operable between a first position (with switch arm 48 in contact with fixed terminal 47) in which the auxiliary chassis de-energizing means 53, 52 are conditioned for concomitant operation with de-energization of receiver chassis 10, and a second position (with switch arm 48 contacting terminal 45) in which the auxiliary chassis de-energizing means 53, 52 are effectively disabled.

FIGURE 2 is an alternative embodiment in which provision is made for remote volume control of television receiver 10. A switch 58 is placed in series with the audio circuit to loudspeaker 20; switch 41 of mute relay 37 is also in series with the audio circuit. Switch 58 comprises a movable contact or switch arm 59 and four fixed terminals 60–63. Terminal 60 is unconnected or floating. A resistance 64 is connected between terminals 61 and 62 and a second resistance 65 is connected between terminals 62 and 63. Terminal 63 is connected to switch 41 of relay 37. Switch arm 59 of switch 58 is connected to loudspeaker 20. Switch arm 59 of switch 58 is mechanically connected to a step relay 66, which in turn is coupled to segregation network 35 (shown in FIGURE 1). When relay 66 is actuated by successive ultrasonic signals from transmitter 30 (shown in FIGURE 1), the relay rotates switch arm 59 of switch 58 in a clockwise direction to each of its terminals 60–63 in sequence. With switch arm 59 contacting terminal 60 the audio circuit to loudspeaker 20 is open. With switch arm 59 contacting terminal 61 resistances 64 and 65 are in series with the audio circuit. With switch arm 59 contacting terminal 62 only resistance 65 remains in the audio circuit and with switch arm 59 contacting terminal 63 no resistance is present in the audio circuit to loudspeaker 20.

An additional switch 67 comprises a switch arm 69 which is coupled by a mechanical linkage 68 to switch arm 59 of switch 58. Switch 67 also comprises fixed terminals 70–73 of corresponding number and orientation to terminals 60–63 of switch 58. The mechanical linkage 68 is arranged so that with switch arm 69 contacting terminal 70 switch arm 59 is contacting terminal 60. Similarly, switch arm 69 contacts terminals 71–73 at the same time that switch arm 59 contacts terminals 61–63. Terminals 71–73 are directly interconnected or shorted together. Terminal 73 is connected to receiver power supply 21 of receiver chassis 10. Switch arm 69 of switch 67 is connected to power plug 22. Terminal 70 of switch 67 is connected to a terminal of a solenoid coil 77 of a time delay relay 74 comprising solenoid coil 77 wound on a nonmagnetic metal tube 78 and containing an axially movable iron core 79. Core 79 is biased by a core-return spring 80 compressed between one end of tube 78 and the core, and is immersed in a silicone liquid fill 81. Relay 74 also includes a latch 52' constructed of iron or other ferromagnetic material, which engages slide bar 46 in the same manner as latch 52 of the embodiment of FIGURE 1. Relay 74 is constructed so that the magnetic field produced by the solenoid coil 77 is not of sufficient strength to attract latch 52' unless movable iron core 79 is inside of coil 77. The other terminal of solenoid coil 77 is coupled to power plug 22 through a switch arm 75 and a fixed terminal 76. Slide bar 46 is operatively connected to switch arm 75 in the same manner as it is connected to switch arm 48, so that with switch arm 48 contacting fixed terminal 47, switch arm 75 contacts fixed terminal 76. With switch arm 48 either in its "off" position or contacting fixed terminal 45, switch arm 75 does not contact terminal 76.

The operation of the embodiment disclosed in FIGURE 2 differs from FIGURE 1 in that step relay 66 is responsive to received control signals for energizing and de-energizing receiver chassis 10 and also controls the volume level of the audio output of receiver chassis 10, whereas relay 38 of FIGURE 1 performs an "on" and "off" function for receiver chassis 10. Upon generation of successive ultrasonic control signals of the appropriate frequency by transmitter 30 (shown in FIGURE 1), relay 66 sequentially rotates or steps switch arms 59 and 69 of switches 58 and 67 in a clockwise direction into contact with each switch terminal. Switches 58 and 67 have the following cycle of operation:

Initially, receiver chassis 10 is "off" with switch arm 69 of switch 67 contacting terminal 70, the power circuit to receiver power supply 21 being open with the switch in this position. The first control pulse causes relay 66 to rotate switch arm 69 of switch 67 into contact with terminal 71 and switch arm 59 of switch 58 into contact with terminal 61. When switch arm 69 contacts any of terminals 71–73, the circuit from power plug 22 to receiver power supply 21 is closed and receiver chassis 10 is energized. With arm 59 contacting terminal 61 the audio circuit to loudspeaker 20 is completed and resistances 64 and 65 are in series with the circuit; the audio volume level is thus established at a low level in this position. A second pulse rotates or steps the switch arms to the next terminals where the volume level is increased due to the removal of resistance 64 from the circuit; receiver chassis 10 remains "on." A third pulse rotates arm 59 into contact with terminal 63 producing the maximum level of volume. The fourth pulse completes the cycle of operation returning to the initial condition by opening the audio circuit to loudspeaker 20 and the power circuit to receiver power supply 21.

With switch arm 48 contacting fixed terminal 47 and switch arm 75 contacting terminal 76, the auxiliary chassis 31 is conditioned for de-energization concomitantly with de-energization of receiver chassis 10. Because of the cyclic nature of the "on-off volume" switches 58 and 67, the user must cycle through "off" when changing from a higher to a lower volume level. To prevent the auxiliary chassis from being de-energized during the cycle through "off," time delay means are provided for rendering the auxiliary-chassis-de-energizing means effective to de-energize the chassis only upon sustained de-energization of the receiver chassis 10. When a succession of control pulses are applied to relay 66 which rotate switch 67 into its "off" position (with switch arm 69 contacting terminal 70), the voltage from power plug 22 is applied to the terminals of solenoid coil 77 of time delay relay 74. Time delay relay 74 operates in the following manner:

When coil 77 is energized, the movable iron core 79 is drawn into the magnetic field produced by the energized coil. But the silicone liquid fill 81 slows down its travel. This provides a time delay. As core 79 is drawn to the opposite end of tube 78, the strength of the magnetic attraction for latch 52' increases until it becomes sufficient to draw the latch towards tube 78. Slide bar 46 is thereby released, de-energizing the auxiliary chassis 31. Coil 77 is de-energized at the same time by the breaking of contact between switch arm 75 and fixed terminal 76. When the coil is de-energized, core 79 returns under the spring pressure of core-return spring 80 to its original position.

The amount of time delay is a function of the core design and the viscosity of the liquid fill. For example if the core 79 is reduced in diameter or the liquid fill 81 is made less viscous there is less time delay since the core encounters less resistance in moving to the end of metal tube 78. At the present time, time delay relays of this type are commercially available which have a delay of between one quarter of a second and two minutes. A suitable time delay relay is available under the trademark of "Silic-O-Netic" from the Heinemann Electric Company.

From the standpoint of the user of the television receiver the delay must be made long enough to permit normal cycling through the "off" position without de-energizing the auxiliary chassis 31 while not so long as to confuse the user into thinking that the delayed shut-off does not work when he leaves switches 58 and 67 in the "off" position. In practice, it has been found that a delay of four to five seconds is adequate to fulfill both of the above requirements.

Except for its time delay feature, time delay relay 74 performs the same functions as relay 53, 52 of FIGURE 1.

Thus, in summary, elements 77–79 of time delay relay 74 constitute means for de-energizing auxiliary chassis 31, while step relay 66, switch 67, switch arm 75, fixed terminal 76, and the associated circuit connections are actuating means for the auxiliary-chassis-de-energizing means which connect the de-energizing means to power plug 22 in response to the proper control signals. The de-energizing means and the actuating means together constitute control-signal responsive means for de-energizing the auxiliary chassis. Finally, the silicone liquid fill contained by metal tube 78 constitutes delay means for rendering the above de-energizing means effective to de-energize auxiliary chassis 31 only upon sustained de-energization of receiver chassis 10.

By giving the user the option of either remotely de-energizing the auxiliary chassis concomitantly with the receiver chassis or de-energizing the receiver chassis separately, the convenience of use, safety, economy, and maintenance requirements of the wave-signal receiver have been greatly improved. The user can now de-energize the auxiliary chassis from the comfort of his armchair or bed. While the user is sleeping, the auxiliary chassis is safely de-energized creating no fire hazard; also the operating life of the auxiliary chassis components has been extended.

Certain aspects of the embodiment of FIGURE 2 are disclosed and claimed in the concurrently filed application of Nicholas Kafka and Marvin A. Wolff, Serial No. 35,551, titled "Wave-Signal Receiver" and assigned to the same assignee as the present application.

While particular embodiments of the invention have been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

I claim:

1. A wave-signal receiver comprising: a receiver chassis including wave-signal receiving circuits; remote control means including an auxiliary chassis responsive to sequentially received remote-control signals and a stepping switch, operative from said auxiliary chassis, having an operating cycle of a predetermined number of positions, in one of which positions said receiver chassis is de-energized and in response to actuation between the remainder of which positions a predetermined operating characteristic of said receiver chassis is varied while maintaining said receiver chassis in an energized condition; control-signal responsive means for de-energizing said auxiliary chassis; bistable switch means, coupled to said auxiliary-chassis-de-energizing means, operable between a first stable position in which said auxiliary chassis de-energizing means are conditioned for concomitant operation with said de-energization of said receiver chassis, and a second stable position in which said auxiliary-chassis-de-energizing means are effectively disabled; and delay means, included within said auxiliary chassis de-energizing means and coupled to said stepping relay, for permitting said auxiliary-chassis-de-energizing means to de-energize said auxiliary chassis, when said bistable switch is in said first stable position, only upon sustained de-energization of said receiver chassis by said remote-control means for a predetermined time interval and for permitting cycling through said one position of said stepping relay without de-energizing said auxiliary chassis, by remote control at the option of the user.

2. Intelligence-reproducing apparatus comprising: a main chassis; remote control means including an auxiliary chassis responsive to receive remote-control signals and a stepping switch, operative from said auxiliary chassis, having an operating cycle of a predetermined number of positions, in one of which positions said main chassis is de-energized and in response to actuation between the remainder of which positions predetermined control is exercised over the operation of said main chassis while maintaining said main chassis in an energized condition; control-signal responsive means for de-energizing said auxiliary chassis; and bistable switch means, coupled to said auxiliary-chassis-de-energizing means, operable between a first stable position in which said auxiliary chassis de-energizing means are conditioned for concomitant operation with said de-energization of said main chassis, and a second stable position in which said auxiliary-chassis-de-energizing means are effectively disabled; and delay means, included within said auxiliary chassis de-energizing means and coupled to said stepping relay, for permitting said auxiliary-chassis-de-energizing means to de-energize said auxiliary chassis, when said bistable switch is in said first stable position, only upon sustained de-energization of said main chassis by said remote control means for a predetermined time interval and for permitting cycling through said one position of said stepping relay without de-energizing said auxiliary chassis, by remote control at the option of the user.

References Cited by the Examiner

UNITED STATES PATENTS

| | | | |
|---|---|---|---|
| 2,188,498 | 1/1940 | Curtis | 250—20.43 |
| 2,216,671 | 10/1940 | McDonald | 250—20.41 |
| 2,817,025 | 12/1957 | Adler | 250—20.41 |
| 2,903,575 | 9/1959 | Polley | 250—20.38 |
| 2,992,412 | 7/1961 | Spindler | 343—228 |

DAVID G. REDINBAUGH, *Primary Examiner.*

SAMUEL B. PRITCHARD, *Examiner.*

J. R. GAFFEY, P. A. ROBEY, S. J. GLASSMAN,
*Assistant Examiners.*